Dec. 29, 1931.     F. N. WOODMAN     1,839,072
LINK CONVEYER BELT
Filed May 19, 1931     2 Sheets-Sheet 1

Inventor
Francis N. Woodman
By Attorneys
Southgate Hay & Hawley

Dec. 29, 1931.   F. N. WOODMAN   1,839,072
LINK CONVEYER BELT
Filed May 19, 1931    2 Sheets-Sheet 2

Inventor
Francis N. Woodman
By Attorneys

Patented Dec. 29, 1931

1,839,072

UNITED STATES PATENT OFFICE

FRANCIS N. WOODMAN, OF CLINTON, MASSACHUSETTS

LINK CONVEYER BELT

Application filed May 19, 1931. Serial No. 538,505.

This invention relates to a belt particularly designed for conveying metal parts through a heat-treatment furnace or under other high temperature conditions.

It is the general object of the invention to provide a conveyer belt for such purposes which is relatively light in weight, low in thermal capacity, and also economical to manufacture.

An important feature of the invention resides in the provision of spacer elements between the links, which spacer elements are formed integral with the links and are preferably produced by partially severing and laterally displacing parts of the body portions of the links to form spacing lugs or projections.

My invention further relates to arrangements and combinations of parts which will be hereinafter described and more particularly pointed out in the appended claims.

Preferred forms of the invention are shown in the drawings, in which

Figure 7:
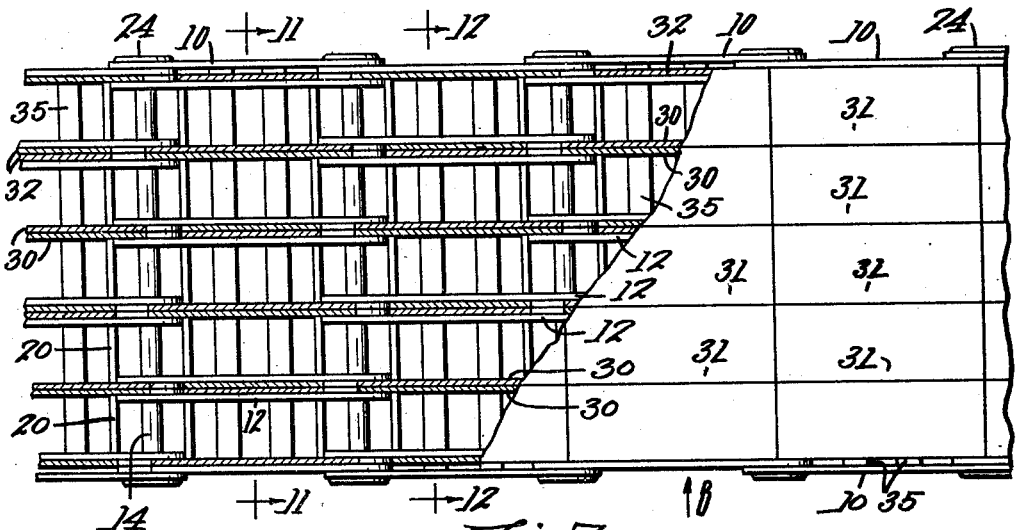
Fig. 7 is a plan view, partly in section, showing a modified construction of my improved belt.
Figure 8:
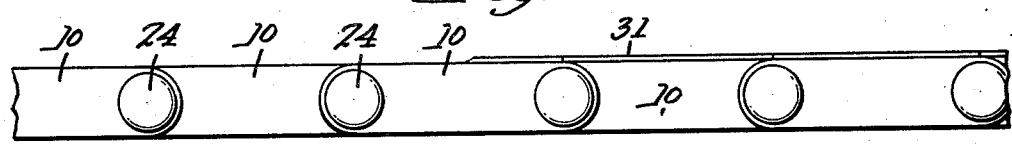
Fig. 8 is a side elevation of the belt shown in Fig. 7.
Figure 10:
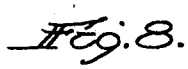
Fig. 10 is a plan view of a blank from which the link shown in Fig. 9 may be conveniently formed.
Figure 10:
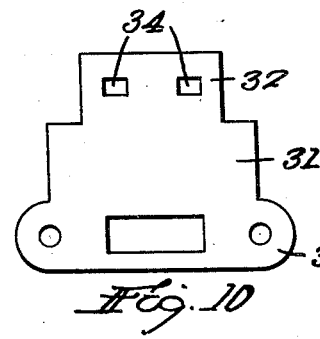
Figure 9:
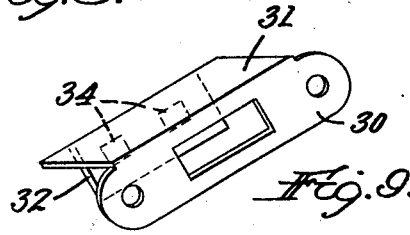
Fig. 9 is a perspective view of a combination connector and cover link.
Figure 11:
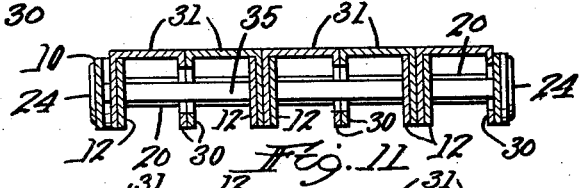
Figure 13:
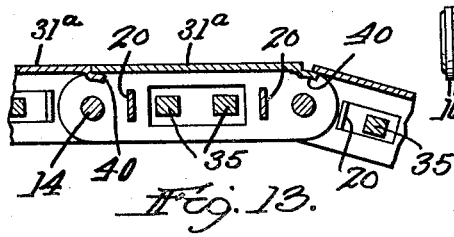
Figure 12:
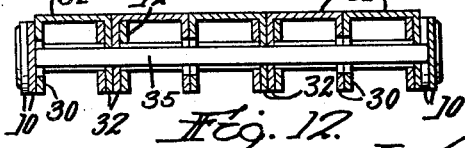

Figs. 11 and 12 are transverse sectional elevations of the belt, taken along the line 11—11 and 12—12 in Fig. 7 respectively, and Fig. 13 is a longitudinal sectional elevation showing a slight further modification.

Referring to the drawings, my improved link conveyer belt comprises connector links 10, spacer links 12 and cross rods or hinge-pins 14. The links 10 and 12 are preferably formed from flat sheet metal and the connector links 10 are straight flat pieces of stock having perforations 15 in the opposite ends thereof for the cross-pins 14.

Figure 1:
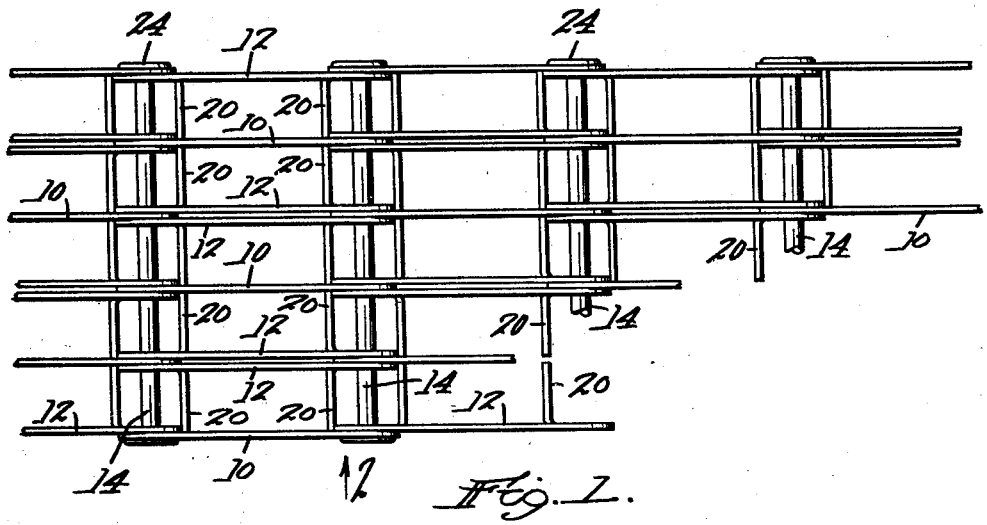
Fig. 1 is a partial plan view of my improved belt.
Figure 2:
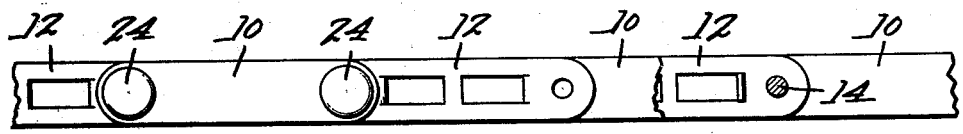
Fig. 2 is a side elevation thereof, looking in the direction of the arrow 2 in Fig. 1.
Figure 3:
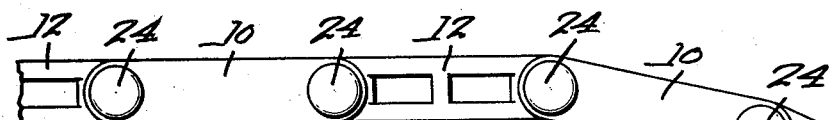
Fig. 3 is a side elevation showing the manner in which the belt adapts itself to a guiding pulley.
Figures 4, 6:
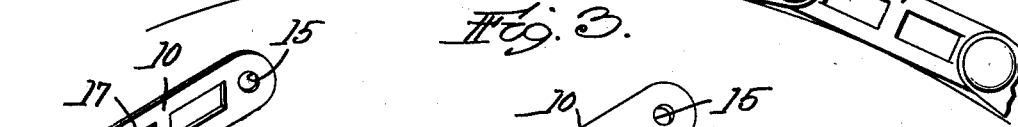
Figs. 4 and 5 are perspective views of two kinds of links used in building up my improved belt.
Fig. 6 is a perspective view of a modified connector link.

The connector links 10 may be provided with openings 17, as indicated in Fig. 6, where it is desired to still further lighten the belt.

Figure 5:
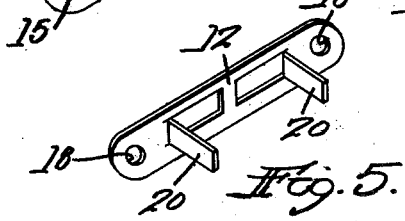

The spacer links 12 are provided with perforations 18 and with laterally projecting lugs 20, preferably formed integral with the link 12 by partially severing portions of the body of the link and displacing these portions laterally, as clearly shown in Fig. 5. In this way the spacing lugs or projections 20 are formed without the use of any additional parts or material, and at the same time the weight of the body of the link 12 is correspondingly lightened and its thermal capacity reduced.

In assembling the belt, the spacer links 12 are disposed in pairs, with their lugs 20 extending in opposite directions, and a connector link 10 is placed on each cross rod between each pair of spacer links 12. The lugs 20 extend outward and engage the sides of the next adjacent connector links 10, thus holding the component parts of the belt in definitely separated relation.

The hinge-pins 14 are passed through the perforations 15 and 18 in the ends of the links 10 and 12 and are provided with enlarged heads 24, preventing displacement thereof. These heads may be conveniently produced by welding thin washers or collars to the ends of the hinge-pins, one of these welding operations being performed on each rod after the parts are assembled.

Having described the detailed construction of one form of my improved belt, the advantages thereof will be readily apparent. The links are formed entirely of flat sheet metal and the spacers are formed by laterally displacing integral portions of the links, which procedure lightens the body of the link as well as avoiding the use of any additional spacer material. All parts of the belt are held in definitely spaced relation and all parts are readily manufactured from alloy steel adapted to withstand high temperature.

In Figs. 7 to 13 inclusive I have shown a modified construction by which my invention is adapted to the production of belts having a substantially continuous supporting surface and adapted for the transportation of very small articles or of granular or powdered materials. In this construction, the connector links 30 are provided with laterally extending cover portions 31 (Fig. 9) and with down-turned edge portions 32. The links 30 and extensions 31 and 32 may be conveniently formed by bending operations from the perforated blank shown in Fig. 10.

These combination connector and cover links are assembled with spacer links 12 constructed as previously described and having lugs or projections 20, engaging the sides of the connector links 30 and holding the links 12 in spaced relation therefrom, as in the previous construction.

The down-turned edge portions 32 project downward in the spaces between adjacent spacer links 12, as indicated in Figs. 7 and 11. The down-turned portions 32 may be perforated as indicated at 34 to receive cross bars 35, which extend through the perforations 34 throughout the width of the belt and thus prevent the portions 32 from being moved upwardly and thereby causing displacement of the cover portions 31 out of the plane of the belt. The cross bars may be held from endwise displacement by engagement with the edge connector links 10 which are preferably provided with end openings 15 only, as shown in Fig. 4. In certain constructions and for certain purposes the cross bars 35 may be omitted.

When an exceptionally tight conveying surface is desired, one end of each cover portion 31ᵃ (Fig. 13) may be displaced downwardly, as indicated at 40, so as to project under the adjacent end of the next combination connector and cover link, thus providing a substantially continuous conveying surface and preventing the occurrence of spaces between adjacent links when the belt bends in passing over a pulley.

From the above description, it will be evident that the form of belt shown in Figs. 7 to 12 embodies the advantages of the previously described belt and in addition provides a substantially continuous and unbroken conveying surface, which is desirable and necessary for the transportation of certain parts or materials.

Having thus described my invention and the advantages thereof, I do not wish to be limited to the details herein disclosed, otherwise than as set forth in the claims, but what I claim is:—

1. A conveyer belt comprising a plurality of straight flat connector links, a plurality of spacer links, and hinge-pins pivotally joining said links together, said spacer links having laterally projecting portions engaging the sides of said connector links and maintaining said links definitely separated.

2. A conveyer belt comprising a plurality of straight flat connector links, a plurality of spacer links, and hinge-pins pivotally joining said links together, said spacer links having laterally projecting portions integral therewith and displaced laterally therefrom, said projecting portions engaging the sides of said connector links and maintaining said links definitely separated.

3. A conveyer belt comprising a plurality of connector links, a plurality of spacer links, and hinge-pins pivotally joining said links together, said links being formed from flat sheet metal and said spacer links having portions partially severed and displaced outwardly from the body thereof to form spacing projections engaging the sides of said connector links and maintaining said links definitely separated.

4. A conveyer belt comprising a plurality of connector links, a plurality of spacer links, and hinge-pins pivotally joining said links together, each spacer link having lateral projections between the hinge-pins passing through said link, and said projections being substantially spaced from said hinge-pins and engaging the sides of adjacent links to maintain the links in definitely spaced relation.

5. A conveyer belt comprising a plurality of connector links, a plurality of spacer links, and hinge-pins pivotally joining said links together, each spacer link having lateral projections between the hinge-pins passing through said link, and said projections being substantially spaced from said hinge-pins and engaging the sides of adjacent links to maintain the links in definitely spaced relation, and said hinge-pins having enlarged ends preventing further lateral separation of the links.

6. A conveyer belt comprising a plurality of connector links, a plurality of spacer links, and hinge-pins pivotally joining said links together, each spacer link having lateral projections between the hinge-pins passing through said link and said projections being substantially spaced from said hinge-pins and engaging the sides of adjacent links to maintain the links in definitely spaced relation, and said connector links having flat cover portions extending laterally from the connector portions and bridging the spaces between adjacent connector links.

7. A conveyer belt comprising a plurality of connector links, a plurality of spacer links, and hinge-pins pivotally joining said links together, each spacer link having lateral projections between the hinge-pins passing through said link and said projections being substantially spaced from said hinge-pins and engaging the sides of adjacent links to maintain the links in definitely spaced relation, and said connector links having flat cover portions extending laterally from the connector portions and bridging the spaces between adjacent connector links and having down-turned outer edge portions extending into the spaces between adjacent spacer links.

8. The combination in a conveyer belt as set forth in claim 7, in which the down-turned portions are perforated and in which cross bars are provided, extending through said perforations and preventing upward displacement of said edge portions and of the cover portions integral therewith.

9. A conveyer belt comprising a plurality of connector links, a plurality of spacer links, and hinge-pins pivotally joining said links together, each spacer link having lateral projections between the hinge-pins passing through said link and said projections being substantially spaced from said hinge-pins and engaging the sides of adjacent links to maintain the links in definitely spaced relation, and said connector links having flat cover portions extending laterally from the connector portions and bridging the spaces between adjacent connector links, said cover portions being downwardly offset at one end to provide overlapping joints between successive links.

In testimony whereof I have hereunto affixed my signature.

FRANCIS N. WOODMAN.